US012785756B2

(12) United States Patent
Newman et al.

(10) Patent No.: US 12,785,756 B2
(45) Date of Patent: Nov. 3, 2026

(54) AUTOMATIC CONDITION-BASED ADJUSTMENT OF TRANSMISSION POWER IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 779 days.

(21) Appl. No.: 18/104,910

(22) Filed: Feb. 2, 2023

(65) Prior Publication Data

US 2023/0179261 A1 Jun. 8, 2023

Related U.S. Application Data

(63) Continuation of application No. 17/879,907, filed on Aug. 3, 2022, now Pat. No. 11,581,919, which is a (Continued)

(51) Int. Cl.
*H04B 7/01* (2006.01)
*G01S 5/00* (2006.01)
(Continued)

(52) U.S. Cl.
CPC .............. *H04B 7/01* (2013.01); *G01S 5/0027* (2013.01); *G01S 5/0054* (2013.01); *H04L 1/0003* (2013.01); *H04W 16/28* (2013.01); *H04W 52/08* (2013.01); *H04W 52/225* (2013.01); *H04W 52/282* (2013.01); *H04W 52/283* (2013.01); *H04W 52/285* (2013.01);
(Continued)

(58) Field of Classification Search
CPC ........ H04B 7/01; H04W 72/51; H04W 16/28; H04W 52/08; H04W 52/225; H04W 52/282; H04W 52/283; H04W 52/285; H04W 64/00; H04W 64/003; H04W 64/006; H04W 72/02; H04W 72/0453; H04W 72/0473; H04W 28/0268; H04W 52/228; H04W 92/18; G01S 5/0027; G01S 5/0054; H04L 1/0003
See application file for complete search history.

(56) References Cited

U.S. PATENT DOCUMENTS 6,167,268 A 12/2000 Souissi
6,593,880 B2 7/2003 Velazquez
(Continued)

*Primary Examiner* — John J Lee

(57) ABSTRACT

In a wireless network that includes mobile users (such as vehicles), the signal quality is constantly changing due to changing distances from the base station, variable attenuation factors such as passing obstructions, and beamforming in 5G and 6G networks. An automatic algorithm can compensate for transmission variations by adjusting the transmission power of the base station and/or the mobile user device, to account for the current location and motion of the mobile user device. The radio attenuation factor can be measured throughout the base station's region, and the attenuation map can be used to boost downlink power to vehicles in dead zones, while saving power in regions of good receptivity. The base station can thereby maintain the expected QoS despite motions. An AI model may be used to select the optimal power level.

20 Claims, 8 Drawing Sheets

Related U.S. Application Data continuation of application No. 17/526,182, filed on Nov. 15, 2021, now Pat. No. 11,438,033.

(60) Provisional application No. 63/278,578, filed on Nov. 12, 2021, provisional application No. 63/276,745, filed on Nov. 8, 2021, provisional application No. 63/276,139, filed on Nov. 5, 2021, provisional application No. 63/274,221, filed on Nov. 1, 2021, provisional application No. 63/118,156, filed on Nov. 25, 2020, provisional application No. 63/117,720, filed on Nov. 24, 2020, provisional application No. 63/114,168, filed on Nov. 16, 2020.

(51) Int. Cl.

| | |
|---|---|
| ***H04L 1/00*** | (2006.01) |
| ***H04W 16/28*** | (2009.01) |
| ***H04W 52/08*** | (2009.01) |
| ***H04W 52/22*** | (2009.01) |
| ***H04W 52/28*** | (2009.01) |
| ***H04W 64/00*** | (2009.01) |
| ***H04W 72/02*** | (2009.01) |
| ***H04W 72/044*** | (2023.01) |
| ***H04W 72/0453*** | (2023.01) |
| ***H04W 72/51*** | (2023.01) |
| *H04W 28/02* | (2009.01) |
| *H04W 92/18* | (2009.01) |

(52) U.S. Cl.

CPC ......... *H04W 64/00* (2013.01); *H04W 64/003* (2013.01); *H04W 64/006* (2013.01); *H04W 72/02* (2013.01); *H04W 72/0453* (2013.01); *H04W 72/0473* (2013.01); *H04W 72/51* (2023.01); *H04W 28/0268* (2013.01); *H04W 52/228* (2013.01); *H04W 92/18* (2013.01)

(56) References Cited

U.S. PATENT DOCUMENTS

| | | | | |
|---|---|---|---|---|
| 8,254,281 | B2 | 8/2012 | Hadad | |
| 2003/0125046 | A1 | 7/2003 | Riley | |
| 2007/0021122 | A1 | 1/2007 | Lane | |
| 2010/0124212 | A1 | 5/2010 | Lo | |
| 2011/0238286 | A1 | 9/2011 | Roesser | |
| 2012/0106386 | A1 * | 5/2012 | Johansson ............. | H04W 24/10<br>370/252 |
| 2013/0287080 | A1 | 10/2013 | Li | |
| 2014/0302872 | A1 | 10/2014 | Lane | |
| 2015/0043437 | A1 | 2/2015 | Chakraborty | |
| 2017/0208600 | A1 | 7/2017 | Hsu | |
| 2018/0083730 | A1 | 3/2018 | Gulati | |
| 2018/0138963 | A1 | 5/2018 | Hernando | |
| 2018/0206075 | A1 | 7/2018 | Demirdag | |
| 2018/0279246 | A1 | 9/2018 | Gan | |
| 2019/0045337 | A1 | 2/2019 | Sun | |
| 2019/0132709 | A1 | 5/2019 | Graefe | |
| 2019/0222302 | A1 | 7/2019 | Lin | |
| 2019/0281561 | A1 * | 9/2019 | Sawai ................... | H04W 16/14 |
| 2019/0342841 | A1 | 11/2019 | Wu | |
| 2020/0133308 | A1 | 4/2020 | Raichelgauz | |
| 2020/0186236 | A1 | 6/2020 | Wang | |
| 2020/0187133 | A1 * | 6/2020 | Syed ................... | H04W 52/365 |
| 2020/0295809 | A1 | 9/2020 | Wang | |
| 2020/0296710 | A1 | 9/2020 | Logothetis | |
| 2020/0367067 | A1 | 11/2020 | Haley | |
| 2021/0029653 | A1 | 1/2021 | Zhang | |
| 2021/0037361 | A1 | 2/2021 | Zhang | |
| 2021/0136700 | A1 | 5/2021 | Arad | |
| 2021/0385755 | A1 | 12/2021 | Zavesky | |

* cited by examiner

FIG. 3A

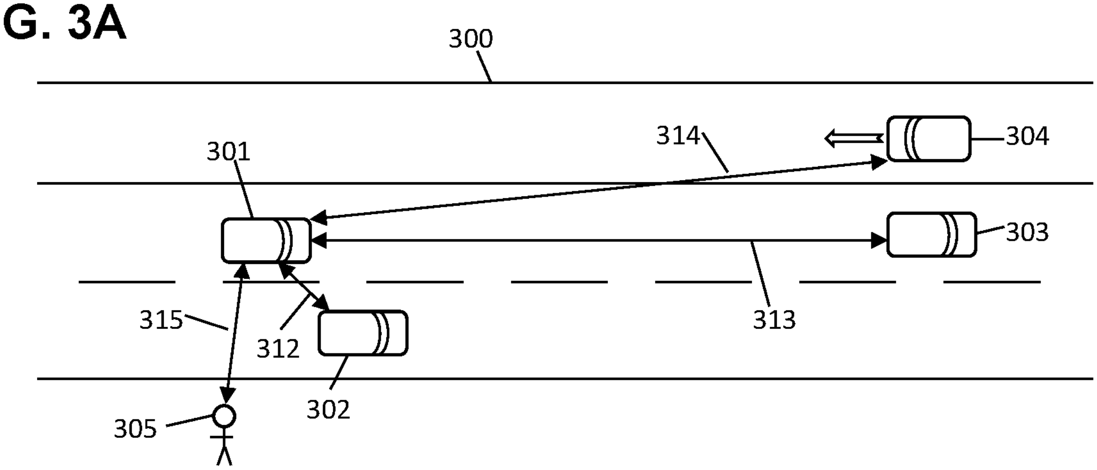

FIG. 3B

351 - USER-1 DETERMINES OWN LOCATION, SPEED, AND DIRECTION.

↓

352 - USER-1 BROADCASTS MESSAGE INDICATING LOCATION, SPEED, AND DIRECTION OF TRAVEL TO OTHER USERS.

↓

353 - OTHER USERS DETERMINE THEIR LOCATIONS, SPEEDS, AND DIRECTIONS, THEN BROADCAST MESSAGES INDICATING SAME.

↓

354 - USER-1 CALCULATES DISTANCE TO OTHER USERS VERSUS TIME, ASSUMING CONSTANT SPEED AND STAYING ON ROAD.

↓

355 - USER-1 CALCULATES POWER REQUIRED TO COMMUNICATE UNICAST WITH USER-2 AT CURRENT DISTANCE.

↓

356 - USER-1 TRANSMITS MESSAGE TO USER-2 AT CALCULATED POWER.

AUTOMATIC CONDITION-BASED ADJUSTMENT OF TRANSMISSION POWER IN 5G AND 6G

PRIORITY CLAIMS AND RELATED APPLICATIONS

This application is a continuation of U.S. patent application Ser. No. 17/879,907, entitled "Transmission Power Compensation by Attenuation Mapping in 5G and 6G", filed Aug. 3, 2022, which is a continuation of U.S. patent application Ser. No. 17/526,182, entitled "Location-Based Power for High Reliability and Low Latency in 5G/6G", filed Nov. 15, 2021, which claims the benefit of U.S. Provisional Patent Application Ser. No. 63/144,168, entitled "High-Power Transmission of Priority Wireless Messages", filed Nov. 16, 2020, and U.S. Provisional Patent Application Ser. No. 63/117,720, entitled "Automatic Frequency Correction for Wireless Mobile Communications", filed Nov. 24, 2020, and U.S. Provisional Patent Application Ser. No. 63/118,156, entitled "Automatic Frequency Correction for Wireless Mobile Communications", filed Nov. 25, 2020, and U.S. Provisional Patent Application Ser. No. 63/274,221, entitled "Rapid Doppler Correction for Mobile V2X Communication in 5G/6G", filed Nov. 1, 2021, and U.S. Provisional Patent Application Ser. No. 63/276 139, entitled "Location-Based Power for High Reliability and Low Latency in 5G/6G", filed Nov. 5, 2021, and U.S. Provisional Patent Application Ser. No. 63/276,745, entitled "AI-Based Power Allocation for Efficient 5G/6G Communications", filed Nov. 8, 2021, and U.S. Provisional Patent Application Ser. No. 63/278,578, entitled "Location-Based Beamforming for Rapid 5G and 6G Directional Messaging", filed Nov. 12, 2021, all of which are hereby incorporated by reference in their entireties.

FIELD OF THE INVENTION

Disclosed are systems and methods for adjusting the transmission power of a wireless message according to the location of the recipient.

BACKGROUND OF THE INVENTION

Reliability and latency are key requirements for many wireless communications. Each wireless user generally has reliability and latency requirements, based for example on the QoS or QoE that the user expects. In some cases, however, a user may experience insufficient reliability due to reception errors, or unsatisfactory latency due to delays from faulted or collided messages, among other mishaps. What is needed is means for users to obtain enhanced communication reliability and reduced latency when needed to mitigate deteriorating conditions.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a mobile user device to communicate, the method comprising: determining a first location of the mobile user device; determining a second location of an antenna of a base station; determining a QoS (quality of service) of a planned uplink message; determining a current noise or interference level; using an algorithm that takes, as input, the location of the user device. the location of the base station, the QoS, and the current noise or interference level, and provides, as output, a recommended transmission power level; and transmitting the planned uplink message according to the recommended transmission power level.

In another aspect, there is non-transitory computer-readable media in a base station of a wireless network, the media containing instructions that when implemented in a computing environment cause a method to be performed, the method comprising: determining an attenuation map indicating radio attenuation factors at multiple locations on the map; receiving a location message from a mobile user device, the location message indicating a location of the mobile user device; determining, according to the attenuation map, a particular radio attenuation factor at the location of the mobile user device; calculating, according to an algorithm, a transmission power level; and transmitting a reply message to the mobile user device according to the transmission power level.

In another aspect, there is a processor comprising an AI (artificial intelligence) model in a base station, wherein: the AI model takes, as input, a location of a mobile user device, a speed of the mobile user device, and a direction of the mobile user device; and the AI model provides, as output, a recommended transmission power level for transmitting a downlink message from the base station to the mobile user device.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 3A is a schematic showing an exemplary embodiment of vehicles communicating with power compensation, according to some embodiments.

FIG. 3B is a flowchart showing an exemplary embodiment of a procedure for a mobile user devices to compensate for distance, according to some embodiments.

Like reference numerals refer to like elements throughout.

DETAILED DESCRIPTION

Figure 1A:
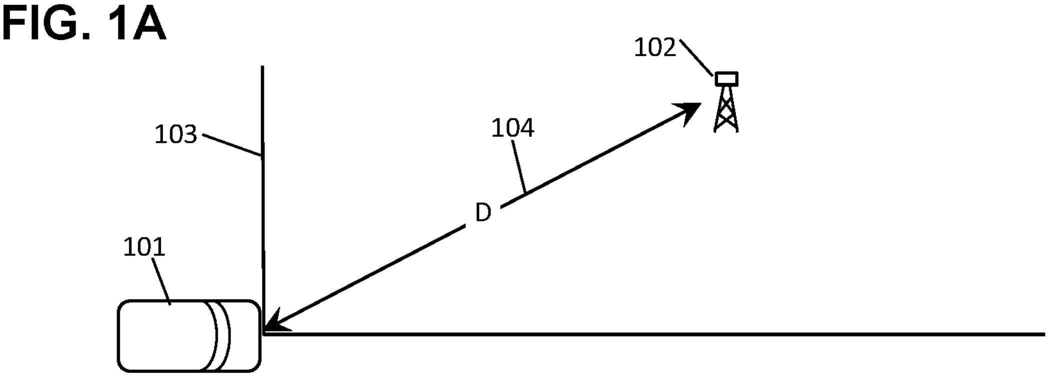
FIG. 1A is a schematic showing an exemplary embodiment of a mobile user device communicating with a base station, according to some embodiments.

Disclosed herein are systems and methods for a user device of a wireless network to obtain enhanced message reliability and low latency by causing a transmitter to vary the transmission power level according to the location of the recipient, thereby preventing message errors in 5G and 6G wireless communications. Systems and methods disclosed herein (the "systems" and "methods", also occasionally termed "embodiments" or "arrangements" or "versions", generally according to present principles) can provide urgently needed wireless communication protocols to adjust transmitter power to prevent receiver message faults, enhance message reliability, and provide low latency when required. Versions provide location-based adjustment of transmitter power, with automatic power enhancement to overcome local obstructions, while further protocols may be suitable for both reduced-capability user devices and high-performance/high-demand customers in managed 5G/6G networks as well as V2V and V2X sidelink communications between user devices in motion.

Most wireless communications are not transmitted at the maximum power available. Transmissions with power in excess of that required for reception would waste energy (a consideration particularly for battery-operated devices), generate heat, and potentially interfere with other users such as those in adjoining networks. When the density of users is high, the potential for noise and interference from other transmitters becomes increasingly problematic. Therefore, the base station usually instructs each user device to restrict its transmission amplitude based on the reception SNR or SINR (signal to interference and noise ratio) received by the base station, and that amplitude is generally lower than the maximum power that the user device's transmitter could achieve. Likewise the user devices may send signal-quality reports back to the base station regarding the downlink signal quality received by the user devices, and those reports may enable the base station to adjust its own transmission power to be just sufficient for reception by each user. However, in some cases, a user may need enhanced communication reliability or reduced latency, especially when reception deteriorates due to long range or an obstruction, for example. In those cases it may be advantageous to enhance communication reliability and avoid retransmission delays by automatically increasing the transmission power above the level normally allowed or normally employed, without the need for a power scan with feedback messages and the like. If the condition necessitating the power increase then subsides, the transmission power can be automatically returned to normal, according to some embodiments.

Terms herein generally follow 3GPP (third generation partnership project) standards, but with clarification where needed to resolve ambiguities. As used herein, "5G" represents fifth-generation and "6G" sixth-generation wireless technology. A network (or cell or LAN or local area network or the like) may include a base station (or gNB or generation-node-B or eNB or evolution-node-B or access point) in signal communication with a plurality of user devices (or UE or user equipment or nodes or terminals) and operationally connected to a core network (CN) which handles non-radio tasks, such as administration, and is usually connected to a larger network such as the Internet. Embodiments may include direct user-to-user ("sidelink") communication such as V2V (vehicle-to-vehicle) communication, V2X (vehicle-to-anything), X2X (anything-to-anything, also called D2D or device-to-device) and base station communications or V2N (vehicle-to-network). Here, "vehicle" is to be construed broadly, including any mobile wireless communication device. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. Each modulated resource element of a message is referred to as a "symbol" in references, but this may be confused with the same term for a time interval. Therefore, each modulated reference element of a message is referred to as a "message element" in examples below. A "demodulation reference " is a set of modulated resource elements that exhibit levels of a modulation scheme (as opposed to conveying data), and each resource element of a demodulation reference is termed a "reference element" herein. A message may be configured "time-spanning" by occupying sequential symbols at a single frequency, or "frequency-spanning" on multiple subcarriers at a single symbol time (also called "frequency-first" if the message continues on multiple symbol times). "CRC" (cyclic redundancy code) is an error-checking code. "RNTI" (radio network temporary identity) or "C-RNTI" (cell radio network temporary identification) is a network-assigned user code. "QoS" is quality of service, or priority. "QCI" (QoS class identifier) defines various performance levels. A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A device "listens" or "monitors" a channel or frequency if the device receives, or attempts to receive, signals on the channel or frequency. A message is "faulted" or "corrupted" if one or more bits of the message are altered relative to the original message. "Receptivity" is the quality of reception of a message. "QPSK" (quad phase-shift keying) is a modulation scheme with two bits per message element, and 16 QAM (quadrature amplitude modulation with 16 states) is a modulation scheme with 4 bits per message element.

Embodiments of the systems and methods include a user device configured to determine the distance to a base station and to adjust its uplink transmission power level so that the amplitude as-received by the base station is in a prescribed range. Further embodiments include a base station configured to determine the distance to the user device and adjust its downlink transmission power level for sufficient reception by the user device. Also disclosed are charts or maps or the like, indicating regions of obstruction or poor receptivity. Alternatively, the maps or the like may indicate transmission power levels versus location, including enhanced power levels to account for obstructions or regions of reduced receptivity, for example. A user device and/or a base station can maintain such maps or the like in non-transitory computer-readable memory, and can thereby adjust its transmission power level to provide sufficient reception according to the location of the user device. The systems and methods further include direct user-to-user messaging, with power compensation depending on the locations of the transmitting and receiving entities. Further embodiments include mobile user devices and/or base stations configured to calculate an updated distance between two entities based on a previously determined location and speed and direction of travel of the two entities, then calculate an updated power level based at least in part on the updated distance, and to transmit a message according to the updated transmission power level.

A motivation for the systems and methods disclosed herein may include improving signal reception at longer range and among obstructions automatically, while avoiding time-consuming power scans and feedback messaging. A further motivation may be to enhance reliability by reducing message faults by providing sufficient as-received amplitude despite changing conditions. A further motivation may be to provide low latency by avoiding delays associated with non-acknowledgements and message retransmissions.

Following are examples of a mobile user device adjusting its uplink transmission power for satisfactory receptivity, based on the distance between the user device and the base station.

FIG. 1A is a schematic showing an exemplary embodiment of a mobile user device communicating with a base station, according to some embodiments. As depicted in this non-limiting example, a user device 101, depicted as a vehicle in top view, is in communication with a base station 102, depicted as an antenna. Locations of the user device 101 and the base station 102 are relative to a reference frame 103, such as the geographic latitude and longitude, or other suitable frame. The distance D 104 between the user device 101 and the base station 102 is indicated. To determine the distance 104, the user device 101 can determine its own location using, for example, a satellite-based navigation system such as GPS, or a map, a local address, or other suitable geographical locating system. The user device 101 can also determine the location of the base station 102 using a published database of network information, or a map, or a previous registration on that base station, or a message from the base station 102, or from another base station having the relevant data, or other suitable means for locating the base station. The user device 101 can then calculate the distance 104 according to a suitable formula, such as: adding the square of the latitude distance between the two entities, plus the square of the longitude distance, and taking the square root of that sum. To sufficient accuracy, the longitude distance is the circumference of the Earth times the difference in longitude degrees, divided by 360, and the latitude distance is the circumference of the Earth times the cosine of the latitude degrees, times the difference in latitude degrees, divided by 360.

The user device 101 can then determine a transmission power level according to the distance 104. For example, the user device 101 may include (in non-transitory computer-readable memory) an algorithm, formula, computer code, tabulation, or other way of relating the transmission power level to the distance 104. For example, the algorithm may select a lower power level for shorter distances to avoid overdriving the base station receiver, and higher power levels for longer distances to enable the base station to receive a message reliably. Using that selected power level, the user device 101 may then transmit an uplink message to the base station 102 indicating, among other data, the location of the user device 101, or the distance calculated, or both. The base station 102 may then repeat the distance calculation and/or employ its own algorithm to determine a sufficient power level for downlink communications with the user device 101 across that distance 104. The base station 102 may then transmit an acknowledgement to the user device 101 using that sufficient power level. In some embodiments, the uplink message and/or the acknowledgement may be transmitted according to 5G or 6G technology.

An advantage of determining the distance 104 and the selected power level before transmitting the message, may be that the message may arrive at the destination with sufficient amplitude to be reliably received, but not so much amplitude that it would overdrive the receiver or interfere with other user devices elsewhere. Another advantage may be that a time-consuming "power scan" may be avoided. (A power scan is a time-consuming iterative procedure by which the user device repeatedly transmits short messages at various power levels and the base station indicates which messages are detected and, optionally, the amplitude level received. A second power scan may then be required, with the base station varying the downlink power and the user device indicating receptivity.) Another advantage may be that the message may be received with high reliability and low latency, by avoiding message faults due to insufficient power. A further advantage may be that the user device may avoid the delays and energy wastage involved in receiving a non-acknowledgement (or no acknowledgement within a predetermined interval) and then retransmitting the message at a higher power level.

Another advantage may be that the depicted procedures may be compatible with devices that may have difficulty complying with prior-art 5G or 6G registration procedures. Another advantage may be that the depicted procedures may be implemented as a software (or firmware) update, without requiring new hardware development, and therefore may be implemented at low cost, according to some embodiments. The procedures may be implemented as a system or apparatus, a method, or instructions in non-transitory computer-readable media for causing a computing environment, such as a user device, a base station, or other signally-coupled component of a wireless network, to implement the procedure. As mentioned, the examples are non-limiting. Other advantages may be apparent to skilled artisans after reading this disclosure. The advantages in this paragraph may apply equally to other embodiments described below.

Figure 1B:
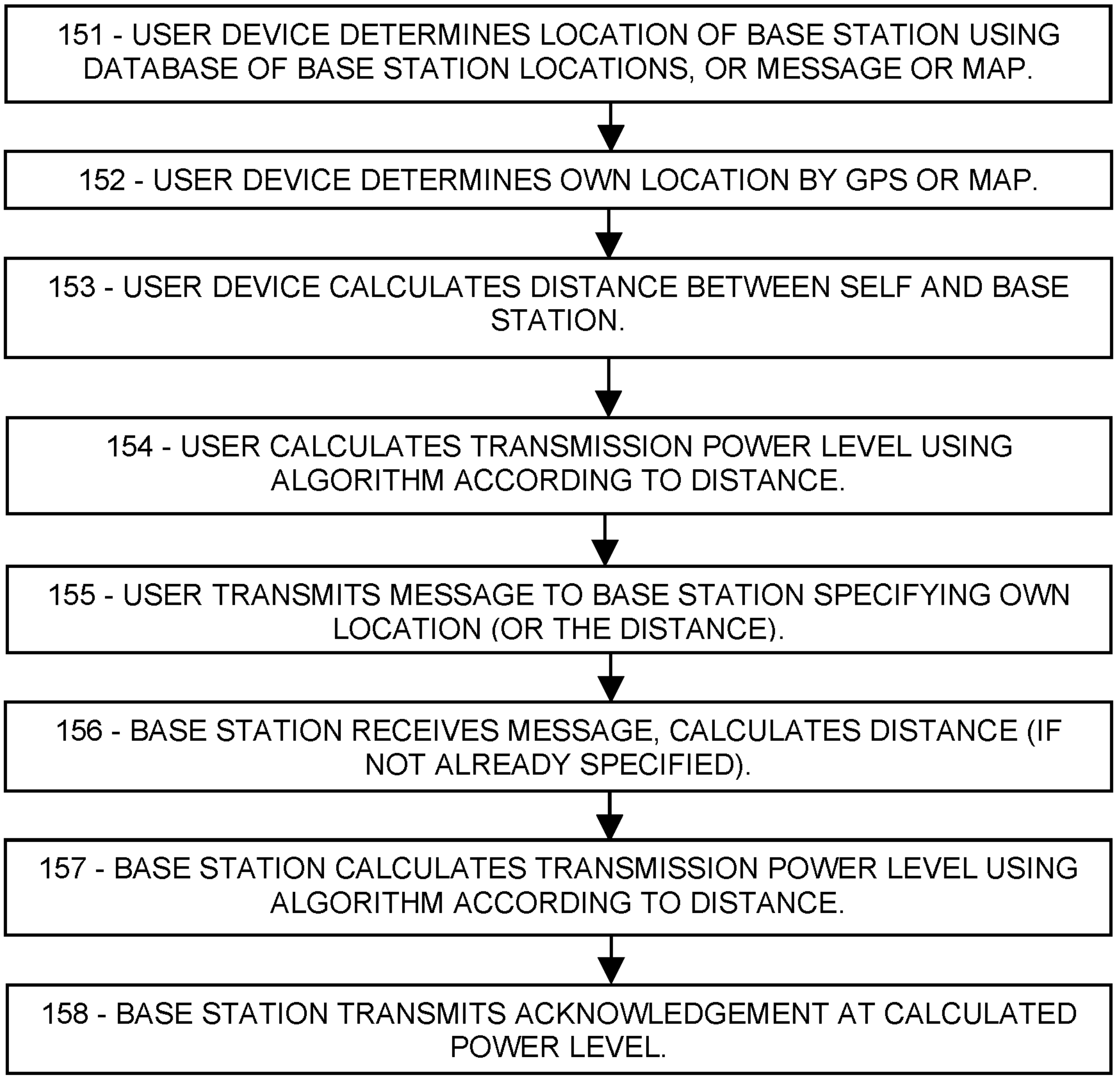
FIG. 1B is a flowchart showing an exemplary embodiment of a procedure for a mobile user device and a base station to adjust their transmission power levels, according to some embodiments.

FIG. 1B is a flowchart showing an exemplary embodiment of a procedure for a mobile user device and a base station to adjust their transmission power levels, according to some embodiments. As depicted in this non-limiting example, at 151 a mobile user device, such as a vehicle, determines the location of a base station, such as a base station proximate to the user device. The user device may determine the base station's location using a publicly accessible tabulation of base station locations, or a message from that base station, or a message from another base station or from some other transmitter, or a map of base station locations, or other way of finding the base station's location. Then, if not sooner, the user device determines, at 152, its own location using, for example, GPS or other means. At 153 the user device calculates the distance between itself and the base station according to the locations determined.

At 154, the user device calculates a transmission power level to use in communicating with the base station. That calculation may employ an algorithm or formula or function or computer code or graphical correlation or interpolatable tabulation or other means for determining a suitable and sufficient power based at least in part on the distance. At 155, the user device transmits an uplink message using the calculated power level. The transmission power level may be adjusted by adjusting an amplifier in the transmitter, or digitally by calculating a transmission waveform with a particular amplitude, or other means well known in the radio arts. In some embodiments, the uplink message may include an indication of the user device's location, or of the calculated distance, or other data enabling the base station to adjust its power level corresponding to the distance.

At 156, the base station receives the uplink message and adjusts its downlink transmission power level according to the distance. The base station may also check the user device's analysis by recalculating the distance, depending on which items of information are included in the uplink message. At 157, the base station may use an algorithm, or the like, to calculate a sufficient transmission power level based at least in part on the distance. The base station's power level may differ from that of the user device because their antennas may be quite different, among many other differences between the base station and the user device. Then, at 158, the base station may transmit an acknowledgement, or other message, to the user device, using the downlink power level thus determined. The user device and the base station may thereby communicate with sufficient reliability upon their first exchanged messages, without performing power scans, and with little chance of message failure, according to some embodiments.

The systems and methods further include procedures for base stations to compensate for obscurations that may interfere with communications, based on the mobile user device location, as described in the following examples.

Figure 2A:
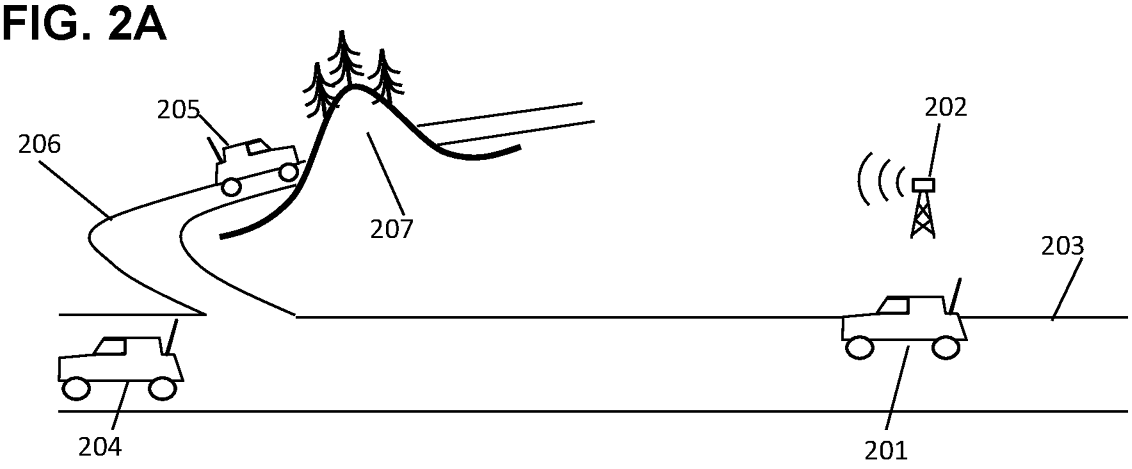
FIG. 2A is a sketch showing an exemplary embodiment of a mobile user device passing by an obscuration, according to some embodiments.

FIG. 2A is a sketch showing an exemplary embodiment of a mobile user device passing by an obscuration, according to some embodiments. As depicted in this non-limiting example, a first mobile user device 201, depicted as a vehicle, communicates with a base station 202, depicted as an antenna, while traveling on a main road 203. A second mobile user device 204 is on the same road 203 but farther ahead. The figure shows the first user device 201 quite close to the base station 202, while the second user device 204 is much farther from the base station 202. The user devices 201 and 204 may be configured to determine their distance from the base station 202, by comparing their own location to the base station's location, and may adjust their uplink transmission power levels accordingly to provide a particular signal amplitude as-received by the base station. The user devices 201 and 204 may also communicate their calculated distances to the base station 202, so that the base station 202 can adjust its downlink transmission power higher for the shorter distance of user device 201, and higher power for the longer distance of user device 204, and thereby provide sufficient amplitude as-received for reliable reception by each of the user devices 201 and 204.

In some embodiments, the first user device 201 may include, in its message to the base station 202, an indication of its speed and direction of travel, in addition to its current location. Using that information, the base station 202 may be configured to calculate the distance to that user device 201 as a function of time. The base station 202 can then adjust its downlink transmission power level according to the time-dependent distances, and thereby deliver sufficient receptivity while avoiding the need for frequent position-updating message exchanges from the user devices 201 and 204. In the position calculation, the base station 202 may assume that the velocity of the user device 201 remains constant at the stated value, and that the user device (if a vehicle) follows the curves of whatever road it is on, unless informed otherwise. The base station 202 may thereby calculate the distance as a function of time, and may adjust its power level accordingly, without the need for frequent position-updating messages from the user devices 201 and 204.

The figure also shows a third user device 205 on a side road 206 that passes behind an obscuration depicted as a hill 207, which attenuates the signal. The base station 202 may calculate the location of the third user device 205 based on its speed and direction, as well as the way the side road 206 curves. The base station 202 may thereby determine that the user device 205 is about to pass behind the hill 207, and therefore may increase the transmission power of any messages to that user device 205. In addition, the base station 202 may calculate, based on the speed of the third user device 205, when it is expected to emerge from the obstruction 207, and may revert to the normal power level thereafter. In addition, the base station 202 may have previously determined (by experimentation, for example) how much to increase the transmit power, so that the third user device 205 may receive messages reliably while obscured.

The third user device 205 may include a similar map of receptivity, and may adjust its uplink power level higher according to the receptivity map, so that the base station 202 can continue to receive messages from the user device 205 when the uplink signal is attenuated.

Figure 2B:
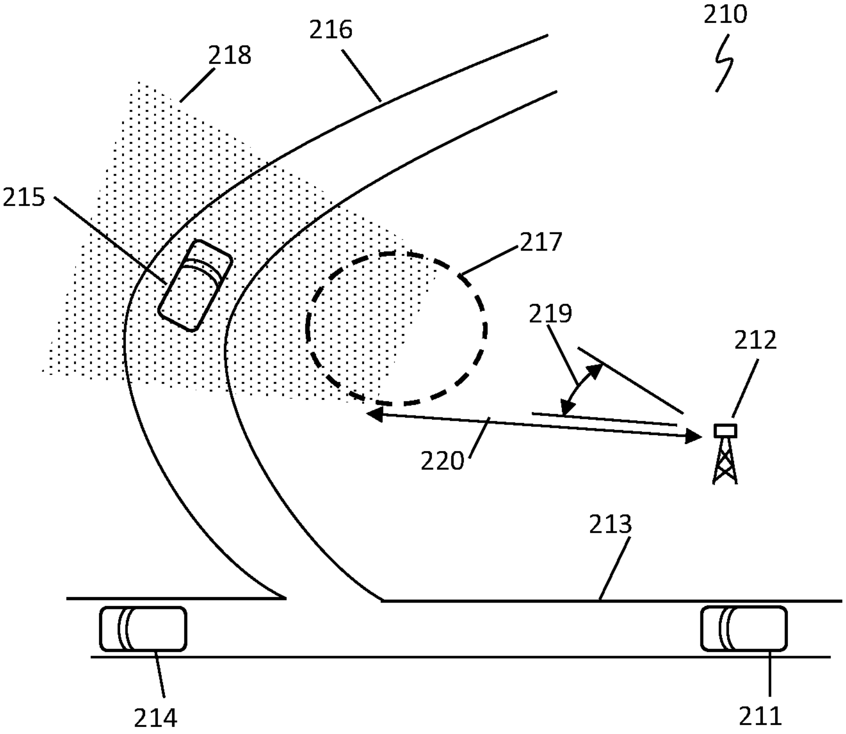
FIG. 2B is a schematic showing an exemplary embodiment of a base station compensating for signal attenuation, according to some embodiments.

FIG. 2B is a schematic showing an exemplary embodiment of a base station compensating for signal attenuation, according to some embodiments. As depicted in this non-limiting example, a map 210 of the scenario of FIG. 2A includes the first, second, and third user devices 211, 214, 215 on a main road 213 and a side road 216, plus a base station 212 and a hill 217 (in dash). Also shown is a region of reduced receptivity 218 (stipple) in which messages transmitted from the base station 212 are attenuated by the obscuration hill 217. The region of reduced receptivity 218 is determined, in this case, by the size of the hill 217, which subtends an angle 219 as viewed by the base station 212, at a distance 220 from the base station 212. Hence, as discussed, the base station 212, can receive a message from the third user device 215 indicating the third user device's location and speed and direction, can then the base station 212 can determine that the third user device 215 is on the side road 216 where it passes through the region of reduced receptivity 218. In addition, the base station 212 can calculate the times that the third user device 215 is expected to enter and exit the region of reduced receptivity 218. Accordingly, the base station 212 may increase its transmission power to an enhanced power level greater than the normal power level for that distance, and may transmit messages to the third user device 215 according to the enhanced power level while it is obscured, and may thereby compensate the attenuation. As mentioned, the base station 212 may have previously determined, from experiments for example, an attenuation level or an enhanced transmission power level, and thus can determine by how much to increase the power to keep the received message amplitudes roughly the same for mobile user devices inside and outside the region of reduced receptivity 218.

Mobile wireless users are generally quite familiar with "dead zones" along the routes they routinely travel, where receptivity is poor. Each base station serving the area can generate an area map, such as that depicted but extending throughout a region. The area map may include contour levels or the like, indicating the degree of signal attenuation at each region, as viewed by the base station. Alternatively, the map may indicate what level of power is needed for adequate reception at each point in the area as viewed by the base station. Each base station can then adjust its power accordingly so that messages to user devices passing through each obscuration zone are properly received. Each base station's receptivity map may also indicate regions where the reception from that base station is so poor, that the user device may be better served by another base station. In that case, the initial base station can arrange a hand-off to the other base station as the user device is approaching the obscuration, so that the user device can have uninterrupted service.

Figure 2C:
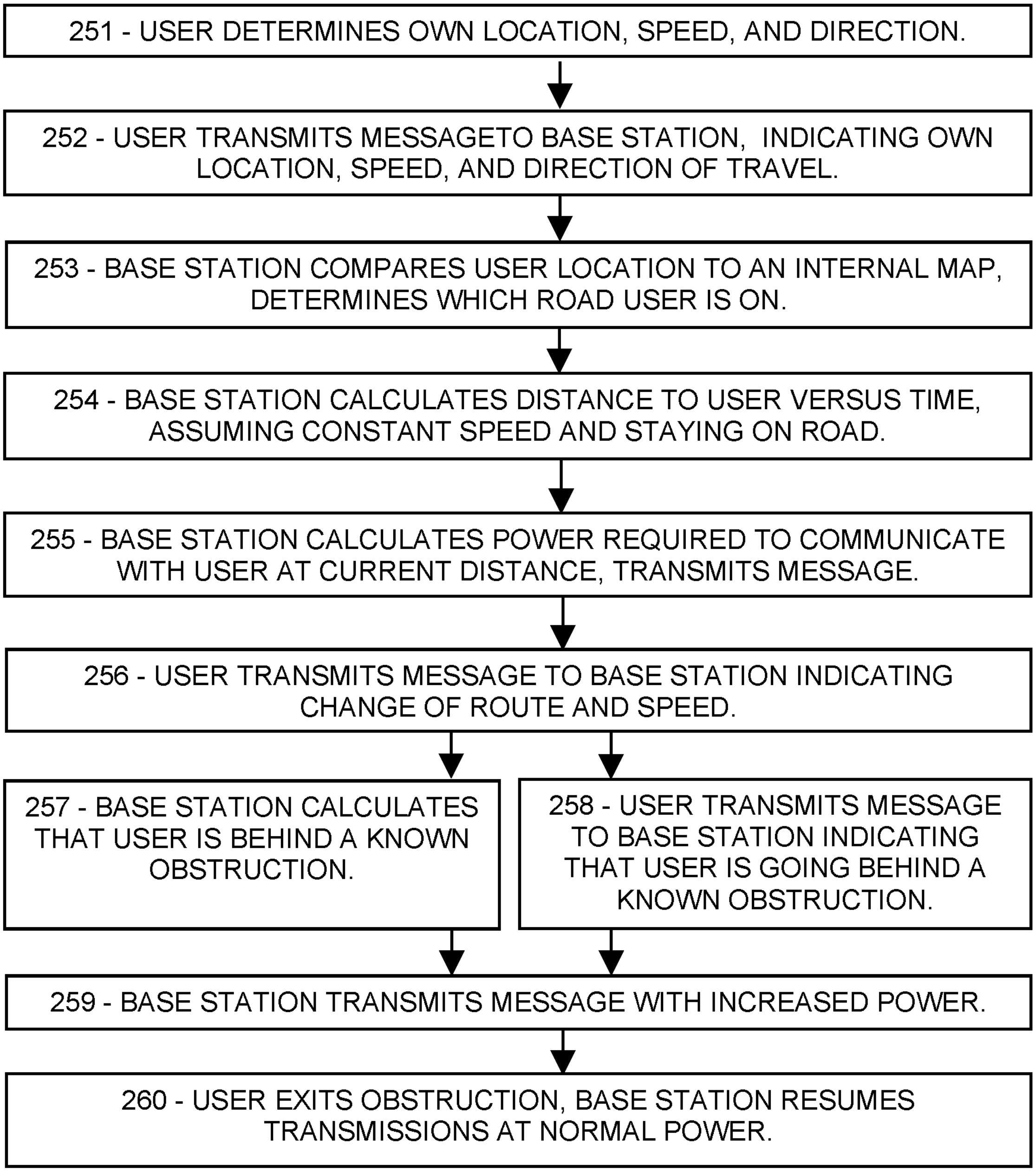
FIG. 2C is a flowchart showing an exemplary embodiment of a procedure for a mobile user device and a base station to compensate for signal obscuration, according to some embodiments.

FIG. 2C is a flowchart showing an exemplary embodiment of a procedure for a mobile user device and a base station to compensate for signal obscuration, according to some embodiments. As depicted in this non-limiting example, at 251, a mobile user device determines its own location, speed, and direction of travel using, for example, satellite navigation, a speedometer, and an electronic compass. At 252, the user device transmits a message with this information to a base station. At 253, the base station compares the location with a map (or database of road locations, contained in non-transitory computer-readable memory) to determine which road the user device is on. The base station may also check that the direction and speed are consistent with the road, and other consistency tests. At 254, the base station calculates a formula for the distance to the user device versus time, based on the speed. The base station may also take into account current traffic conditions, known changes in the road such as curves, and other factors that may influence the position extrapolation. Then at 255, the base station may have a message to send to the user device, and may calculate the distance from the base station to the user device at that moment using the formula, or according to the road map, or otherwise. Optionally, the base station may also monitor the amount of background noise or interference that may degrade the reception of the message. The base station may then determine how much transmitter power is required to transmit the message so that the user device will likely receive it without fault, based at least in part on the distance and/or the current background level, and then may transmit the message.

At 256, the user device has changed direction or speed, and therefore may transmit an uplink message to the base station informing it of the change. Using that updated information, at 257, the base station may calculate that the user device is about to pass behind a known obscuration. Alternatively, at 258, the user device may transmit a message indicating that it is about to pass behind an obscuration or is about to enter a known "dead zone" based, for example, on past experience. In either case, at 259, the base station may transmit a downlink message to the user device using increased transmitter power, to overcome the attenuation caused by the obscuration. At 260, the base station may determine that the user device has likely exited from the obscuration zone according to its stated speed, and therefore the base station may resume transmissions to the user device with the normal power level.

In this way a base station, or a core network attached to multiple access points, may keep track of the positions and receptivity of the various mobile user devices that they serve, and may increase or decrease transmission power to compensate for obstructions, and may thereby provide communications with relatively constant reliability as the user devices move around.

The systems and methods further include procedures for user devices to communicate directly with each other, not involving a base station. The user devices in such a sidelink communication may adjust their transmission power to provide sufficient reception to other user devices based on location, as described in the following examples.

FIG. 3A is a schematic showing an exemplary embodiment of vehicles communicating with power compensation, according to some embodiments. As depicted in this non-limiting example, a first vehicle 301 is in communication with a second, third, and fourth vehicle 302, 303, 304 on a highway 300, as well as a pedestrian 305. The figure shows the distances 312, 313, 314 from the first vehicle 301 to the second, third, and fourth vehicles 302, 303, 304 respectively, and the distance 315 to the pedestrian 305.

Since the various entities are at different distances, the first vehicle 301 may transmit individual messages to them, each with a different power level, so that each receiving entity can receive each message with sufficient amplitude for reliable reception, but without wasting energy on excessively powerful transmissions. For example, the first vehicle 301 may broadcast a message indicating its location and optionally its speed and direction of travel. The other entities 302-305 may receive that message and may reply by transmitting or broadcasting a responsive message specifying their own locations, and optionally their speeds and directions of travel. (Such messages may assist the other vehicles in avoiding collisions, for example.) Thus each of the entities 301-305 can calculate the distance from itself to each other entity in the figure, and can determine a transmission power level according to the calculated distance, to provide sufficient message receptivity. In addition, if the speed and direction information are provided in the messages, each of the entities 301-305 can calculate future locations and future distances, and thereby can adjust the transmission power level for sufficient reception of future messages. For example, the first and third vehicles 301, 303 are on the same side of the highway 300 and therefore are likely traveling in the same direction and approximately the same speed, whereas the fourth vehicle 304 is traveling in the opposite direction as indicated by an arrow. The first vehicle 301 may determine that the distance between itself and the third vehicle 303 is likely constant or slowly varying, whereas the distance to the fourth vehicle 304 is likely changing very rapidly due to their opposite directions. In addition, the first vehicle 301 may determine that the distance 315 between itself and the pedestrian 305 may be changing slowly at first, since the location of the pedestrian 305 is nearly perpendicular to the direction of travel of the first vehicle 301, but that the distance will likely increase geometrically as the first vehicle 301 proceeds down the highway 300.

FIG. 3B is a flowchart showing an exemplary embodiment of a procedure for a mobile user device to compensate for distance, according to some embodiments. As depicted in this non-limiting example, a mobile user device User-1 communicates with a User-2 to adjust transmission power according to the distance between them. At 351, User-1 determines its own location, speed, and direction of travel, and at 352 broadcasts a message indicating those values to other user devices in range. At 353, the other user devices determine their locations, speeds, and directions of travel, then broadcast messages indicating those values. All of the user devices receive each other's messages and determine from them the locations, speeds, and directions of travel of the various user devices.

At 354, User-1 calculates the distance to each of the other user devices according to their locations, and also determines formulas indicating the location of each user device versus time according to its speed and direction of travel. For example, User-1 can determine a first time elapsed since User-1 determined its own location, and a second time elapsed since receiving the location message from a User-2. User-1 can assume that the speed remains constant unless informed of a change in speed. User-1 can then calculate the expected location of itself and of User-2 at the current time according to the elapsed times, speeds, and directions of travel of the two entities. If User-1 has access to a map, such as an electronic roadmap for example, then User-1 can determine which road each user device is currently on, based on their stated locations, and can assume that each user device will remain on the same road until informed of a change, and therefore can project or calculate the position of each user device along each of the roads versus time including curves. It may not be necessary to assume that the direction of travel of a user device remains constant because the road may curve; instead, the speed may be assumed to be constant while the user device follows the road shape.

At 355, User-1 has a message for User-2, and therefore User-1 calculates the expected location of User-2 at that time, based on User-2's stated initial location, speed, and direction of travel, and based on the amount of time passed since User-2 transmitted its location message. User-1 may also determine its own position, which may have changed since User-1 transmitted its location message. Using those updated locations, User-1 then calculates the current distance to User-2, and adjusts its transmission power accordingly. For example, User-1 may have a formula or algorithm or the like to determine a suitable transmission power level to use for satisfactory reception at the calculated distance. Then, at 356, User-1 transmits the message to User-2 with the power set according to the level so determined.

The systems and methods further include message formats for user devices to indicate their locations, and other information, to a base station and/or to other user devices, as disclosed in the following examples.

Figure 4A:
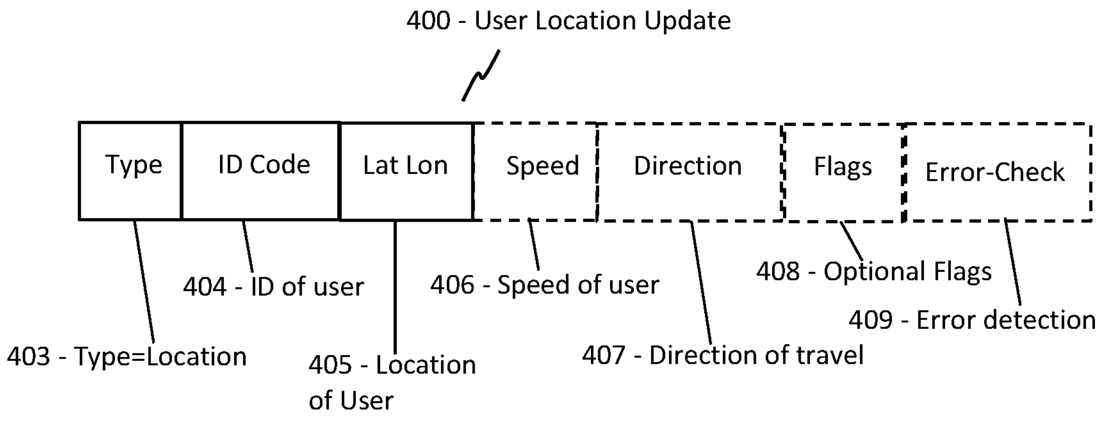
FIG. 4A is a schematic showing an exemplary embodiment of a message format for user devices to indicate locations to base stations, according to some embodiments.

FIG. 4A is a schematic showing an exemplary embodiment of a message format for user devices to indicate locations to base stations, according to some embodiments. As depicted in this non-limiting example, a user location update message 400, for a mobile user device to indicate its location to a base station, may include a message-type field 403, an identification code 404, a location field 405, an optional speed field 406, an optional direction field 407, an optional set of flags 408, and an optional error-check field 409. The message-type field 403 may include a code indicating that the message 400 is a location message including speed and direction of travel. The identification field 404 may include a code such as the C-RNTI code or MAC address or other identifying code of the user device. The location field 405 may include the latitude and longitude of the user device, or a code related to the geographical coordinates. For example, it may not be necessary, in a local application, to include the full-degree portions of the latitude and longitude because the radio range of the base station is generally much less than 100 km, which corresponds roughly to one degree in most of the populated regions of the Earth. In addition, depending on the spatial resolution required, it may not be necessary to indicate the coordinates to high precision. For example, a code including just the third, fourth, and fifth digit after the decimal point in decimal-degree notation may be sufficient to provide meter-scale resolution, and may cover a kilometer range which may be sufficient for traffic applications and industrial automation applications, among others.

The speed field 406 may indicate the speed of the user device in units of, for example, meters per second. The direction field 407 may indicate the compass heading of the user device, or other measure of the direction of travel. This may be encoded as four bits providing an angular resolution of 22.5 degrees, or other encoding depending on the angular resolution required. The flags 408 may indicate, among many other things, whether the user device is accelerating, decelerating, or maintaining a constant velocity, which may help the receiving entity to extrapolate future positions. The error-check field 409 may include a parity code or a CRC or other code configured to reveal message faults.

In another embodiment, a user node may indicate its location and/or motion information during initial access, such as the 4-step initial access procedure in which the user node first transmits a random access preamble on the random access channel of a base station, and the base station replies with an RAR (random access response) message providing a grant. Using the grant, the user device then transmits "Msg3" or third access message, including its identification MAC (media access code) and other information, after which the base station transmits Msg4 (fourth access message) resolving any collisions. For example, the user device may include its location, and optionally its speed and direction of travel, in its Msg3 if the grant provides sufficient space, and if not, the user device may indicate in Msg3 that the user device has additional information to transmit. Then, Msg4 may include a second grant, with which the user device may transmit a fifth message including its location, speed, and direction of travel, among other information.

As an alternative option, the user device may transmit an acknowledgement after receiving Msg4, and may include in the acknowledgement a multiplexed scheduling request for transmitting a subsequent message indicating the location, speed, and direction of travel of the user device.

Figure 4B:
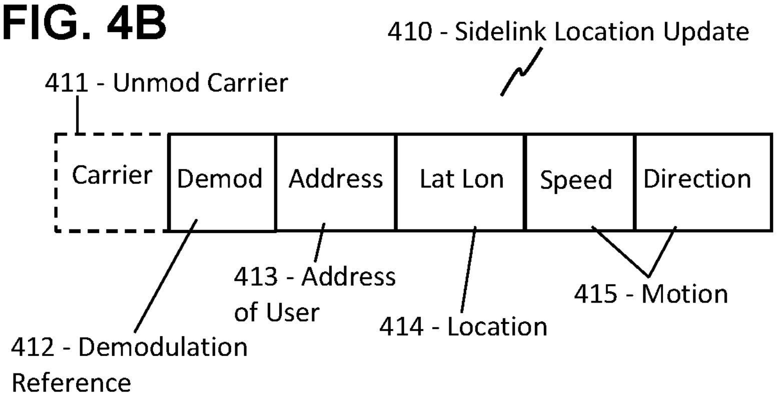
FIG. 4B is a schematic showing an exemplary embodiment of a message format for user devices to indicate locations to other user devices, according to some embodiments.

FIG. 4B is a schematic showing an exemplary embodiment of a message format for user devices to indicate locations to other user devices, according to some embodiments. As depicted in this non-limiting example, a sidelink location update message 410 may be broadcast by a mobile user device to inform other mobile and fixed user devices of the transmitting user device's location and motion. In this example, a base station is not involved. The message 410 may include an optional "carrier" field 411 with unmodulated carrier signal, a demodulation reference 412, an address field 413, a location field 414, and a motion field 415 including speed and direction of travel.

The carrier field 411 may include a sine wave at the subcarrier frequency, but otherwise unmodulated, to assist other user devices in determining the frequency of the rest of the message. The frequency may be affected by drifts in the time-base of the transmitting or receiving user device, Doppler shifts in frequency due to the motions of the user devices, and other effects. The carrier field 411 may enable the receiving entity to adjust its time-base for optimal reception of the rest of the message. The demodulation reference 412 may be a regular DMRS (demodulation reference signal) which is generally encoded in a complex way. Alternatively, the demodulation reference 412 may be a low-complexity short-format demodulation reference with two reference elements, configured to exhibit the maximum and minimum amplitude levels, and the maximum and minimum phase levels, of the modulation scheme, from which the remaining levels can be calculated by interpolation. Alternatively, the short-format demodulation reference 413 may include four reference elements, exhibiting all of the amplitude levels and phase levels of 16 QAM, or all of the phase levels in QPSK, for example, so that no interpolation is needed. Providing the demodulation reference 412 within the message 410 may assist the other user devices in demodulating the rest of the message.

The address field 413 may include a wireless address such as a user-selected code of 8 or 12 or 16 bits, configured by each user device to be different from the codes of all other user devices in range, for example. The location field 414 may include the latitude and longitude of the user device, optionally abbreviated or encoded, as described above. The motion fields 415 may indicate the speed and direction of travel of the user device, as described above. Mobile user devices such as vehicles in traffic may exchange sidelink location update messages as shown to inform each other of their presence, location, and motion, so that the other user devices can transmit to them using an appropriate power level. In addition, collision-avoidance software on each mobile user device can use the location, and motion data to construct a local traffic map and thereby detect imminent collisions, among other uses.

Figure 5A:
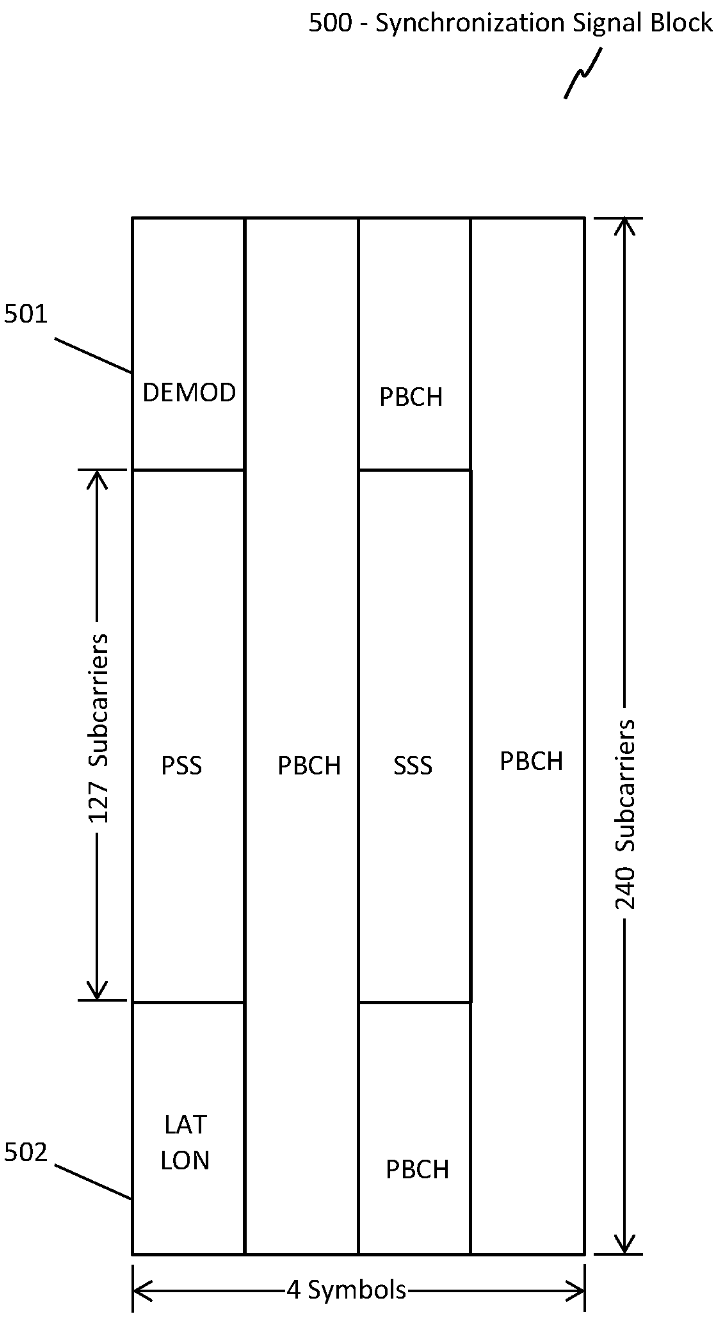
FIG. 5A is a schematic showing an exemplary embodiment of a message format for base stations to indicate locations to user devices, according to some embodiments.

FIG. 5A is a schematic showing an exemplary embodiment of a message format for a base station to indicate its location to user devices, according to some embodiments. As depicted in this non-limiting example, a modified SSB (synchronization signal block) 500 in 5G/6G includes 4 symbol times and 240 consecutive subcarriers, all modulated in QPSK. Within the message 500 are a PSS (primary synchronization signal) of 127 subcarriers, a SSS (secondary synchronization signal) also 127 subcarriers, and four regions with PBCH (physical broadcast channel) which, in this context, includes the MIB (master information block). The PSS, SSS, and PBCH(MIB) provide system information that a user device may require, in order to receive messages on a particular cell. The remaining two regions, indicated as 501 and 502, are unassigned in 5G/6G.

In the depicted embodiment, a demodulation reference is inserted into the first unassigned region 501, to assist user devices in demodulating the rest of the message, and a location is inserted into the second unassigned region 502, indicating the latitude and longitude of the base station (or the antenna of the base station). The full geographical location of the base station may include eight digits for each of the latitude and longitude in decimal degrees, for example, thereby providing about one-meter resolution. The number of bits needed for this resolution is about 53 or 54 depending on encoding, or 27 resource elements at QPSK. Thus the full geographical coordinates can fit within the second region 502, which includes 56 or 57 subcarriers. Thus the base station can indicate, in its SSB message, its location at meter-scale resolution. With the SSB message 500 modified as shown, the bandwidth is unchanged, and the time required is unchanged.

Figure 5B:
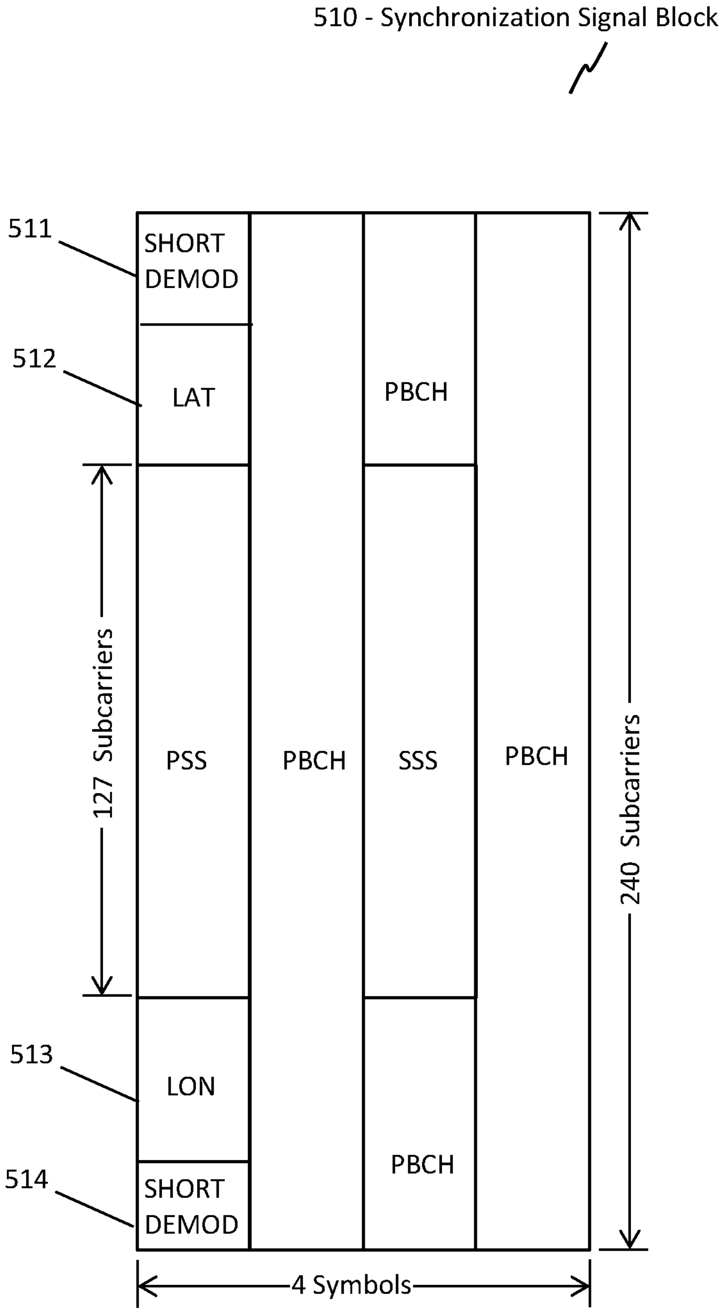
FIG. 5B is a schematic showing another exemplary embodiment of a message format for base stations to indicate locations to user devices, according to some embodiments.

FIG. 5B is a schematic showing another exemplary embodiment of a message format for base stations to indicate locations to user devices, according to some embodiments. As depicted in this non-limiting example, another modified SSB message 510 may include the usual PSS-SSS-PBCH(MIB) structure, plus four new items in the previously unallocated fields of the first symbol time. The modified SSB message 510 may include a short-form demodulation reference 511, shown in the four highest-frequency subcarriers, followed by the latitude value 512. After the PSS, the longitude value 513 is shown followed by another short-form demodulation reference 514 in the lowest-frequency subcarriers. Each of the short-form demodulation references 511 and 514 includes four consecutive reference elements, modulated according to all four values of the phase used in the modulation scheme, which is normally QPSK. (There is no amplitude modulation in QPSK). By providing the short-form demodulation references at the highest and lowest frequency subcarriers, within the message body 510, a user device can demodulate the rest of the message despite interference and noise. For example, each resource element of the message 500 may be compared to an interpolated, or weighted average, of the modulation levels exhibited in the short-format demodulation references 511 and 514. Since the demodulation references 511 and 514 are generally affected by noise and interference in the same way as the rest of the message, each message element may be demodulated according to the interpolated average of the two demodulation references 511 and 514, thereby mitigating the noise and interference including frequency-dependent noise and interference, according to some embodiments.

Figure 5C:
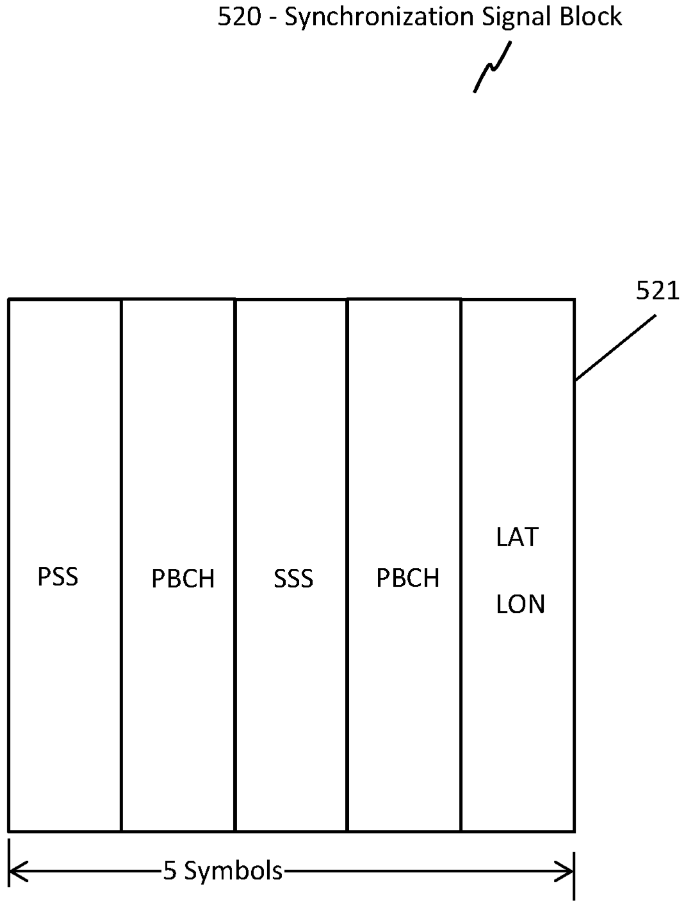
FIG. 5C is a schematic showing an exemplary embodiment of a low-complexity message format for a base station to indicate its location to user devices, according to some embodiments.

FIG. 5C is a schematic showing an exemplary embodiment of a low-complexity message format for a base station to indicate its location to user devices, according to some embodiments. As depicted in this non-limiting example, in a low-complexity SSB message 520, the bandwidth may be reduced to that required for transmitting the PSS and SSS portions, and the size of the BPCH portions may be reduced by reducing the number and/or complexity of parameters, and a fifth symbol 521 may be added. The fifth symbol 521 may contain the latitude and longitude, and optionally other data, of the base station.

Alternatively, the location data may be included in the PBCH, and a fifth symbol may be added to accommodate the PBCH with the location data included. As a further alternative, the low-complexity PBCH may accommodate the location data without the need for a fifth symbol, depending on how many parameters are specified in the low-complexity PBCH.

An advantage of providing the base station location in the SSB message may be to inform each new arrival user device of the base station's location before the user device attempts to acquire further system information from the base station. An advantage of placing two short-form demodulation references at the top and bottom subcarriers may be that frequency-dependent interference and external noise can be mitigated by comparing the phase of each message element to the two short-form demodulation references 511 and 514, or to an interpolated average of the corresponding phase values. An advantage of informing user devices of the base station's location may be that the user devices can then adjust their transmit power for satisfactory reception at the base station without a power scan.

5G, and especially 6G, have enormous potential for communications between mobile user devices and other entities, such as base stations, vehicles in traffic, roadside devices, and innumerable other applications for low-cost wireless communication. The systems and methods disclosed herein are intended to provide means for user devices in motion to mitigate attenuation due to differences in distance and/or intervening obstructions, by adjusting their transmit power levels accordingly. Further disclosed systems and methods may enable base stations to adjust downlink power to compensate for user device distance and the presence of obstructions. In addition, sidelink communications between user devices may benefit from similar power adjustments. Each user device may determine its own location, speed, and direction of travel, as well as the location and other parameters of the intended recipient. These protocols thereby provide readily applicable solutions to long-standing limitations of communications with mobile devices, and may thereby enable many wireless applications with mobile devices that would be unfeasible, absent the systems and methods disclosed herein.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a mobile user device to communicate, the method comprising:

a) determining a first location of the mobile user device;

b) determining a second location of an antenna of a base station;

c) determining a QoS (quality of service) of a planned uplink message;

d) determining a current noise or interference level;

e) using an algorithm that takes, as input, the first location, the second location, the QoS, and the current noise or interference level, and provides, as output, a recommended transmission power level; and f) transmitting the planned uplink message according to the recommended transmission power level;

g) wherein the planned uplink message is a Msg3 (third message of a 4-step initial access procedure) or a MsgA (first message of a 2-step initial access procedure); and h) the planned uplink message indicates the location of the mobile user device.

2. The method of claim 1, wherein the planned uplink message is transmitted according to 5G or 6G technology.

3. The method of claim 1, further comprising:

a) receiving an SSB (synchronization signal block) message from the base station; and b) determining, from the SSB message, the second location.

4. The method of claim 1, wherein:

a) the planned uplink message is transmitted as part of an initial access procedure; and b) the planned uplink message indicates the first location.

5. The method of claim 4, wherein:

a) the planned uplink message further indicates a speed and a direction of travel of the mobile user device.

6. The method of claim 4, wherein:

a. the planned uplink message further indicates a speed and a direction of travel of the mobile user device.

7. The method of claim 1, wherein:

a) the planned uplink message indicates that the mobile user device is entering or exiting a region that has previously exhibited insufficient reception reliability for either downlink or uplink messages.

8. The method of claim 1, further comprising:

a) receiving, from the base station, responsive to the planned uplink message, a downlink message indicating that the mobile user device is being handed off to another base station.

9. The method of claim 1, wherein:

a) the location of the mobile user device is within a region that has previously been determined to have low signal quality according to a message fault rate; and b) increasing the transmission power level of the mobile user device before transmitting the planned uplink message.

10. The method of claim 1, further comprising:

a) after transmitting the planned uplink message, changing a speed or direction of the mobile user device; and b) transmitting a second uplink message indicating an updated location, speed, and direction of the mobile user device.

11. The method of claim 1, further comprising:

a. receiving an SSB (synchronization signal block) message from the base station; and b. determining, from the SSB message, the second location.

12. The method of claim 1, wherein:

a. the planned uplink message is a Msg3 (third message of a 4-step initial access procedure) or a MsgA (first message of a 2-step initial access procedure); and b. the planned uplink message indicates the location of the mobile user device.

13. The method of claim 1, wherein:

a. the planned uplink message is transmitted as part of an initial access procedure; and b. the planned uplink message indicates the first location.

14. The method of claim 1, wherein:

a. the planned uplink message indicates that the mobile user device is entering or exiting a region that has previously exhibited insufficient reception reliability for either downlink or uplink messages.

15. The method of claim 1, wherein:

a. the location of the mobile user device is within a region that has previously been determined to have low signal quality according to a message fault rate; and b. increasing the transmission power level of the mobile user device before transmitting the planned uplink message.

16. The method of claim 1, further comprising:

a. after transmitting the planned uplink message, changing a speed or direction of the mobile user device; and b. transmitting a second uplink message indicating an updated location, speed, and direction of the mobile user device.

17. The method of claim 1, further comprising:

a. receiving an SSB (synchronization signal block) message from the base station; and b. determining, from the SSB message, the second location.

18. The method of claim 1, wherein:

a. the planned uplink message is a Msg3 (third message of a 4-step initial access procedure) or a MsgA (first message of a 2-step initial access procedure); and b. the planned uplink message indicates the location of the mobile user device.

19. A method for a mobile user device to communicate, the method comprising:

a. determining a first location of the mobile user device;

b. determining a second location of an antenna of a base station;

c. determining a QoS (quality of service) of a planned uplink message;

d. determining a current noise or interference level;

e. using an algorithm that takes, as input, the first location, the second location, the QoS, and the current noise or interference level, and provides, as output, a recommended transmission power level;

f. transmitting the planned uplink message according to the recommended transmission power level; and g. receiving, from the base station, responsive to the planned uplink message, a downlink message indicating that the mobile user device is being handed off to another base station.

20. A method for a mobile user device to communicate, the method comprising:

a. determining a first location of the mobile user device;

b. determining a second location of an antenna of a base station;

c. determining a QoS (quality of service) of a planned uplink message;

d. determining a current noise or interference level;

e. using an algorithm that takes, as input, the first location, the second location, the QoS, and the current noise or interference level, and provides, as output, a recommended transmission power level;

f. transmitting the planned uplink message according to the recommended transmission power level;

g. after transmitting the planned uplink message, changing a speed or direction of the mobile user device; and h. transmitting a second uplink message indicating an updated location, speed, and direction of the mobile user device.

* * * * *